(12) United States Patent
Fushimi et al.

(10) Patent No.: US 10,532,545 B2
(45) Date of Patent: Jan. 14, 2020

(54) COMPOSITE AND METHOD FOR PRODUCING THE SAME (71) Applicant: OJI HOLDINGS CORPORATION, Tokyo (JP)

(72) Inventors: Hayato Fushimi, Tokyo (JP); Eiichi Mikami, Tokyo (JP); Hiroki Tanaka, Tokyo (JP); Jintong Han, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 51 days.

(21) Appl. No.: 15/306,001

(22) PCT Filed: Apr. 20, 2015

(86) PCT No.: PCT/JP2015/061981
§ 371 (c)(1),
(2) Date: Oct. 21, 2016

(87) PCT Pub. No.: WO2015/163281
PCT Pub. Date: Oct. 29, 2015

(65) Prior Publication Data
US 2017/0043565 A1 Feb. 16, 2017

(30) Foreign Application Priority Data

Apr. 22, 2014 (JP) ................. 2014-088043

(51) Int. Cl.
| | |
|---|---|
| *B32B 7/12* | (2006.01) |
| *B32B 27/12* | (2006.01) |
| *D21H 27/32* | (2006.01) |
| *B32B 5/02* | (2006.01) |
| *D21H 19/80* | (2006.01) |

(Continued)

(52) U.S. Cl.
CPC ............... *B32B 27/12* (2013.01); *B32B 1/08* (2013.01); *B32B 5/022* (2013.01); *B32B 7/12* (2013.01); *B32B 15/082* (2013.01); *B32B 15/085* (2013.01); *B32B 15/088* (2013.01); *B32B 15/09* (2013.01); *B32B 15/092* (2013.01); *B32B 15/095* (2013.01); *B32B 15/098* (2013.01); *B32B 15/18* (2013.01); *B32B 15/20* (2013.01); *B32B 27/08* (2013.01); *B32B 27/10* (2013.01); *B32B 27/28* (2013.01); *B32B 27/281* (2013.01); *B32B 27/283* (2013.01); *B32B 27/285* (2013.01); *B32B 27/286* (2013.01); *B32B 27/302* (2013.01); *B32B 27/304* (2013.01); *B32B 27/32* (2013.01); *B32B 27/322* (2013.01); *B32B 27/325* (2013.01); *B32B 27/34* (2013.01); *B32B 27/36* (2013.01); *B32B 27/38* (2013.01); *B32B 27/40* (2013.01); *D21H 11/18* (2013.01); *D21H 11/20* (2013.01); *D21H 19/80* (2013.01); *D21H 19/84* (2013.01); *D21H 27/32* (2013.01); *B32B 2250/02* (2013.01); *B32B 2250/03* (2013.01); *B32B 2250/40* (2013.01); *B32B 2255/02* (2013.01); *B32B 2255/06* (2013.01); *B32B 2255/10* (2013.01); *B32B 2255/12* (2013.01); *B32B 2255/20* (2013.01); *B32B 2255/205* (2013.01); *B32B 2255/24* (2013.01); *B32B 2255/26* (2013.01); *B32B 2307/412* (2013.01); *B32B 2307/422* (2013.01); *B32B 2307/72* (2013.01); *B32B 2307/7242* (2013.01); *B32B 2307/7246* (2013.01); *B32B 2307/7265* (2013.01); *B32B 2457/00* (2013.01); *B32B 2457/12* (2013.01); *B32B 2457/20* (2013.01); *B32B 2457/202* (2013.01); *B32B 2457/204* (2013.01); *B32B 2457/206* (2013.01); *B32B 2457/208* (2013.01); *B32B 2590/00* (2013.01)

(58) Field of Classification Search
CPC ........ D21H 19/80; D21H 19/84; D21H 27/32; B32B 2457/20; B32B 27/12; B32B 5/022; B32B 7/12
See application file for complete search history.

(56) References Cited

U.S. PATENT DOCUMENTS 6,258,196 B1 * 7/2001 Suzuki .............. A61F 13/51108
156/176
6,352,785 B1 * 3/2002 Hanada ................. B29C 55/023
428/522

(Continued)

FOREIGN PATENT DOCUMENTS

| CN | 101965387 A | 2/2011 |
|---|---|---|
| CN | 102811858 A | 12/2012 |

(Continued)

OTHER PUBLICATIONS

International Preliminary Report on Patentability and Written Opinion of the International Searching Authority (Forms PCT/IB/338, PCT/IB/373, PCT/IB/326 and PCT/ISA/237), dated Nov. 3, 2016, for International Application No. PCT/JP2015/061981, with an English translation.

(Continued)

*Primary Examiner* — Lawrence D Ferguson
(74) *Attorney, Agent, or Firm* — Birch, Stewart, Kolasch & Birch, LLP (57) ABSTRACT

It is an object to provide a composite in which the adhesion between a sheet layer and a curable resin layer or a film layer is high, and which has high strength and high transparency. The present invention provides a composite wherein a curable resin layer or a film layer is laminated on the one or both surfaces of the sheet layer with a covering layer interposed therebetween, the sheet layer containing fine fibers with an average fiber width of 2 to 1000 nm.

16 Claims, 1 Drawing Sheet

(51) Int. Cl.
*D21H 19/84* (2006.01)
*B32B 15/082* (2006.01)
*B32B 15/085* (2006.01)
*B32B 15/088* (2006.01)
*B32B 15/09* (2006.01)
*B32B 15/092* (2006.01)
*B32B 15/095* (2006.01)
*B32B 15/098* (2006.01)
*B32B 15/18* (2006.01)
*B32B 15/20* (2006.01)
*B32B 27/08* (2006.01)
*B32B 27/10* (2006.01)
*B32B 27/28* (2006.01)
*B32B 27/30* (2006.01)
*B32B 27/32* (2006.01)
*B32B 27/34* (2006.01)
*B32B 27/36* (2006.01)
*B32B 27/38* (2006.01)
*B32B 27/40* (2006.01)
*B32B 1/08* (2006.01)
*D21H 11/18* (2006.01)
*D21H 11/20* (2006.01)

(56) References Cited

U.S. PATENT DOCUMENTS

| | | | |
|---|---|---|---|
| 6,485,815 B1* | 11/2002 | Jeong | C04B 35/5603 257/E21.261 |
| 2006/0182941 A1 | 8/2006 | Yano et al. | |
| 2006/0188430 A1* | 8/2006 | Taniguchi | B32B 27/32 423/512.1 |
| 2011/0117319 A1* | 5/2011 | Yano | D21H 11/08 428/141 |
| 2011/0218303 A1* | 9/2011 | Oshima | C08J 5/18 525/94 |
| 2013/0338250 A1 | 12/2013 | Umemoto et al. | |

FOREIGN PATENT DOCUMENTS

| | | |
|---|---|---|
| CN | 103429622 A | 12/2013 |
| JP | 9-300549 A | 11/1997 |
| JP | 2002-265609 A | 9/2002 |
| JP | 2006-316253 A | 11/2006 |
| JP | 2008-24778 A | 2/2008 |
| JP | 2011-144363 A | 7/2011 |
| JP | 2011-149124 A | 8/2011 |
| JP | 2012-36517 A | 2/2012 |
| JP | 2012-180463 A | 9/2012 |
| JP | 2012-192748 A | 10/2012 |
| JP | 2012-254632 A | 12/2012 |
| JP | 2013-39786 A | 2/2013 |
| JP | 2013-79469 A | 5/2013 |
| JP | 2014-50835 A | 3/2014 |
| JP | 2014-55323 A | 3/2014 |
| JP | 2014-65837 A | 4/2014 |
| WO | WO 2012/070441 A1 | 5/2012 |
| WO | WO 2013/031687 A1 | 3/2013 |
| WO | WO 2013/104520 A1 | 7/2013 |
| WO | 2014192685 A1 | 12/2014 |

OTHER PUBLICATIONS

International Search Report (Forms PCT/ISA/220 and PCT/ISA/210), dated Jul. 14, 2015, for International Application No. PCT/JP2015/061981.
Extended European Search Report for European Application No. 15782224.8, dated Oct. 6, 2017.
Taiwanese Office Action, dated Jun. 4, 2018, for corresponding Taiwanese Application No. 104112509, along with a Partial English translation of the Taiwanese Office Action.
Chinese Office Action and Search Report, dated Feb. 5, 2018 for corresponding Chinese Application No. 201580021073.1, with an English translation of the Chinese Office Action.
Taiwanese Office Action, dated Oct. 25, 2018, for Taiwanese Application No. 104112509, with partial English translation.
Chinese Office Action, dated Jan. 4, 2019, for corresponding Chinese Application No. 201580021073.1, as well as an English translation.
European Office Action, dated Jan. 31, 2019, for corresponding European Application No. 15782224.8.
Japanese Notification of Reasons for Refusal for corresponding Japanese Application No. 2016-514920, dated Sep. 18, 2018, with English translation.
Chinese Office Action, dated May 24, 2019, for corresponding Chinese Application No. 201580021073.1, with partial English translation.
Japanese Office Action, dated Jul. 2, 2019, for corresponding Japanese Application No. 2016-514920, with English machine translation.
Taiwanese Office Action, dated May 13, 2019, for Taiwanese Application No. 104112509, with partial English translation.

* cited by examiner

COMPOSITE AND METHOD FOR PRODUCING THE SAME

TECHNICAL FIELD

The present invention relates to a composite having a sheet layer, which contains fine fibers as a main component, and a curable resin layer or a film layer formed on one or both surfaces of the sheet layer; a composite (nonwoven fabric-resin composite) having a sheet layer (nonwoven fabric layer), which contains fine fibers as a main component, and a curable resin layer or a film layer laminated on one or both surfaces of the sheet layer with a covering layer (easily adhesive layer) interposed therebetween (hereinafter referred to as a "composite"); a composite having a sheet layer, which contains fine fibers as a main component, and a covering layer laminated on one or both surfaces of the sheet layer (hereinafter referred to as a "bonding sheet"); and a method for producing the same. Further, the present invention also relates to an illumination device, a projection device, a signboard or an image display device, or a touch panel or a solar cell, each of which comprises such a composite.

BACKGROUND ART

In recent years, application of reproducible natural fibers has been drawing attention as a substitute for oil resources and in response to increasing environmental awareness. Of all natural fibers, cellulose fibers, in particular, those derived from wood (pulp) are widely used, mainly as paper products. The widths of cellulose fibers used for paper are 10 to 50 μm in most cases. Paper (sheet) obtained from such cellulose fibers is opaque, and is widely used as printing paper. Meanwhile, by treating (refining or grounding) cellulose fibers using a refiner, a kneader, a sand grinder or the like so as to convert them into finer pieces (microfibrils), transparent paper (e.g., glassine) can be obtained. Conventionally, nonwoven fabrics made from cellulose fibers have been used as sheets for printing paper, books, and the like with the addition of a sizing agent, a paper strength additive, and the like. Further, nonwoven fabrics that are made from cellulose fibers with the use of permeability to gas, liquid, or the like are considered to be used for filters, capacitor elements, separators of batteries or capacitors, and the like.

Patent Literature 1 discloses a composite of (a) a nonwoven fabric containing cellulose and (b) resin other than cellulose, in which the content of the (a) component is greater than or equal to 0.1 weight % and less than or equal to 99 weight %, and the content of the (b) component is greater than or equal to 1 weight % and less than or equal to 99.9 weight %. In Patent Literature 1, pores of the (a) nonwoven fabric containing cellulose are filled with the (b) resin other than cellulose.

Patent Literature 2 describes a plastic film with a hard coat layer that is obtained by laminating a primer layer and a hard coat layer on a transparent plastic film. Resin that forms the hard coat layer is a hardened resin composition that contains pentafunctional or higher functional (meth)acrylate, monofunctional (meth)acrylate, and a photopolymerization initiator as the essential components. The transparent plastic used in Patent Literature 2 is a polyester film, in particular, a PET film.

Patent Literature 3 discloses a nonwoven fabric which was obtained by papermaking from cellulose fibers with an average fiber diameter of 0.1 to 20 μm and cellulose nanofibers with an average fiber diameter of less than 100 nm, and a separator for a storage battery element that is made from such a nonwoven fabric.

PRIOR ART LITERATURES

Patent Literatures

Patent Literature 1: JP 2006-316253 A
Patent Literature 2: JP H09-300549 A
Patent Literature 3: JP 2012-36517 A

SUMMARY OF INVENTION

Object to be Solved by the Invention

It is an object of the present invention to provide a composite of a nonwoven fabric and resin, the composite having a resin layer with high adhesion and also having high transparency.

It is another object of the present invention to provide a composite with high strength and high transparency; a composite in which the adhesion between a sheet (sheet layer), which contains fine cellulose fibers as a main component, and a curable resin layer or a film layer is high; and a bonding sheet in which the adhesion between a sheet (sheet layer) which contains fine cellulose fibers as a main component and a covering layer is high.

Means for Solving the Object

The inventors have conducted concentrated studies to achieve the aforementioned objects. Consequently, it has been found to be possible to provide a nonwoven fabric-resin composite having a resin layer with high adhesion and also having high transparency, by laminating a resin layer on one or both surfaces of a nonwoven fabric layer, which contains fine fibers with an average fiber width of 2 to 1000 nm, with an easily adhesive layer interposed therebetween, and the present invention has thus been completed.

Specifically, the inventors have conducted concentrated studies to achieve the aforementioned objects. Consequently, it has been found that 1) a composite having a sheet (hereinafter referred to as a "sheet layer"), which contains as a main component fine fibers with an average fiber width of 2 to 1000 nm, and a curable resin layer or a film layer laminated on one or both surfaces of the sheet layer has high strength and high transparency. In addition, it has been also found that 2) a composite having a sheet layer, which contains as a main component fine fibers with an average fiber width of 2 to 1000 nm, and a curable resin layer or a film layer laminated on one or both surfaces of the sheet layer with a covering layer interposed therebetween as well as 3) a bonding sheet having a sheet layer, which contains as a main component fine fibers with an average fiber width of 2 to 1000 nm, and a covering layer laminated on one or both surfaces of the sheet layer, have high adhesion between adjacent layers, high strength, and high transparency, and the present invention has thus been completed.

That is, according to the present invention, the following invention is provided.

(1) A composite comprising a sheet layer and one of a curable resin layer or a film layer formed on one or both surfaces of the sheet layer, the sheet layer containing as a main component fine fibers with an average fiber width of 2 to 1000 nm.

(2) The composite according to (1), wherein the average fiber width of the fine fibers is 2 to 100 nm.

(3) The composite according to (1) or (2), wherein a density of the sheet layer is greater than or equal to 0.90 g/cm$^3$.

(4) The composite according to any one of (1) to (3), wherein the sheet layer is a nonwoven fabric.

(5) The composite according to any one of (1) to (4), wherein the fine fibers are fibers comprising cellulose fibers.

(6) The composite according to any one of (1) to (5), wherein the one of the curable resin layer or the film layer is laminated on the one or both surfaces of the sheet layer with a covering layer interposed therebetween, the covering layer being provided on one or both surfaces of the sheet layer.

(7) The composite according to (6), wherein a thickness of the sheet layer is 2 to 150 μm, a thickness per covering layer is 0.1 to 30 μm, and a thickness per curable resin layer or film layer is 0.2 to 100 μm.

(8) The composite according to (6) or (7), wherein an adhesion between the sheet layer and the curable resin layer or the film layer, in terms of the number of peeled cells out of 100 cells in a cross-cut test conducted in accordance with JIS K 5400, is less than or equal to 10.

(9) The composite according to any one of (6) to (8), wherein a total luminous transmittance is greater than or equal to 85%, and a haze is less than or equal to 10%.

(10) The composite according to any one of (6) to (9), wherein the covering layer is a hybrid material of an organic component and an inorganic component.

(11) The composite according to (10), wherein the hybrid material of the organic component and the inorganic component contains an organic component and an inorganic component having a silicone skeleton.

(12) The composite according to (10) or (11), wherein the organic component is at least one component selected from the group consisting of a methyl group, a mercapto group, a methacryl group, an acryloyl group, a vinyl group, and an amino group.

(13) The composite according to any one of (10) to (12), wherein the hybrid material of the organic compound and the inorganic compound is silsesquioxane.

(14) The composite according to any one of (6) to (9), wherein the covering layer contains at least one type of resin selected from the group consisting of heat-curable resin, thermoplastic resin, and photo-curable resin.

(15) The composite according to any one of (6) to (9), wherein the covering layer is an adhesive.

(16) A bonding sheet comprising a sheet layer and a covering layer formed on one or both surfaces of the sheet layer, the sheet layer containing as a main component cellulose fine fibers with an average fiber width of 2 to 1000 nm.

(17) The sheet according to (16), wherein the covering layer contains a hybrid material of an organic component and an inorganic component.

(18) The sheet according to (17), wherein the organic component is at least one component selected from the group consisting of a methyl group, a mercapto group, a methacryl group, an acryloyl group, a vinyl group, and an amino group.

(19) The sheet according to (17) or (18), wherein the hybrid material of the organic compound and the inorganic compound is silsesquioxane.

(20) A composite comprising the sheet according to any one of (16) to (19) and one of a curable resin layer or a film layer laminated on the sheet.

(21) A method for producing a composite, comprising:
providing a covering layer on one or both surfaces of a sheet layer, the sheet layer containing as a main component fine fibers with an average fiber width of 2 to 1000 nm; and
providing one of a curable resin layer or a film layer on a surface of the covering layer on a side opposite to the sheet layer.

(22) The method for producing a composite according to (21), wherein the sheet layer and the covering layer are laminated by coating or bonding.

(23) The method for producing a composite according to (21), wherein the covering layer and the one of the curable resin layer or the film layer are laminated by coating or bonding.

(24) An illumination device, a projection device, a signboard or an image display device, a touch panel, or a solar cell, which comprises the composite according to any one of (1) to (20).

[1] A nonwoven fabric-resin composite which comprises a nonwoven fabric layer and a resin layer laminated on one or both surfaces of the nonwoven fabric layer with an easily adhesive layer interposed therebetween, the nonwoven fabric layer containing fine fibers with an average fiber width of 2 to 1000 nm obtained by subjecting a fiber raw material to chemical treatment or refining treatment.

[2] The nonwoven fabric-resin composite according to [1], wherein the average fiber width of the fine fibers is 2 to 100 nm.

[3] The nonwoven fabric-resin composite according to [1] or [2], wherein the density of the nonwoven fabric layer is greater than or equal to 0.90 g/cm$^3$.

[4] The nonwoven fabric-resin composite according to any one of [1] to [3], wherein the thickness of the nonwoven fabric layer is 2 to 150 μm, the thickness of the easily adhesive layer is 0.1 to 30 μm, and the thickness of the resin layer is 0.2 to 50 μm.

[5] The nonwoven fabric-resin composite according to any one of [1] to [4], wherein the adhesion of the resin layer, in terms of the number of peeled cells out of 100 cells in a cross-cut test conducted in accordance with JIS K 5400, is less than or equal to 10.

[6] The nonwoven fabric-resin composite according to any one of [1] to [5], wherein the total luminous transmittance is greater than or equal to 85%, and the haze is less than or equal to 10%.

[7] The nonwoven fabric-resin composite according to any one of [1] to [6], wherein the easily adhesive layer comprises resin.

[8] The nonwoven fabric-resin composite according to any one of [1] to [7], wherein the easily adhesive layer comprises polyester resin or silsesquioxane resin.

[9] The nonwoven fabric-resin composite according to any one of [1] to [8], wherein the resin layer is a resin layer obtained by curing a curable resin precursor through ultraviolet treatment or thermal treatment.

[10] The nonwoven fabric-resin composite according to any one of [1] to [9], wherein the fine fibers are fibers comprising cellulose fibers.

[11] A method for producing the nonwoven fabric-resin composite according to any one of [1] to [10], comprising:
providing an easily adhesive layer on one or both surfaces of a nonwoven fabric layer, the nonwoven fabric layer containing fine fibers with an average fiber width of 2 to 1000 nm obtained by subjecting a fiber raw material to chemical treatment or refining treatment; and
providing a resin layer on a surface of the easily adhesive layer on the side opposite to the nonwoven fabric layer.

[12] An illumination device, a projection device, a signboard or an image display device, a touch panel, or a solar cell, which comprises the nonwoven fabric-resin composite according to any one of claims [1] to [10].

Advantageous Effects of Invention

According to the present invention, there is provided a composite of a nonwoven fabric and resin, the composite having a resin layer with high adhesion and also having high transparency. More specifically, according to the present invention, there are provided 1) a composite with high strength and high transparency, 2) a composite in which the adhesion between a sheet layer and a curable resin layer or a film layer is high and that has high strength and high transparency, and 3) a bonding sheet in which the adhesion between a sheet layer and a covering layer is high and that has high strength and high transparency.

REFERENCE SIGNS LIST

1 Sheet layer
2 Covering layer
3 Curable resin layer or film layer

EMBODIMENTS FOR CARRYING OUT THE INVENTION

Hereinafter, the present invention will be described in further detail. It should be noted that the materials, methods, numerical ranges, and the like described in the present specification are not intended to be limited thereto or not intended to exclude the use of other materials, methods, numerical ranges, and the like. The numerical range of the values "x to y" means the range of the values x to y, inclusive. The "main component" refers to a component whose mass is the highest of all components.

A nonwoven fabric-resin composite of the present invention is characterized in that a resin layer is laminated on one or both surfaces of a nonwoven fabric layer containing fine fibers with an average fiber width of 2 to 1000 nm, which has been obtained by subjecting a fiber raw material to chemical treatment or refining treatment, with an easily adhesive layer interposed therebetween. That is, the nonwoven fabric-resin composite of the present invention is a laminated body including at least a nonwoven fabric layer, an easily adhesive layer, and a resin layer. More specifically, the composite of the present invention is characterized by 1) a composite having a sheet layer, which contains as a main component fine fibers with an average fiber width of 2 to 1000 nm, and a curable resin layer or a film layer laminated on one or both surfaces of the sheet layer, 2) a composite having a sheet layer, which contains as a main component fine fibers with an average fiber width of 2 to 1000 nm, and a curable resin layer or a film layer laminated on one or both surfaces of the sheet layer with a covering layer interposed therebetween, or 3) a bonding sheet having a sheet layer, which contains as a main component fine fibers with an average fiber width of 2 to 1000 nm, and a covering layer laminated on one or both surfaces of the sheet layer. That is, the composite of the present invention is 1) a composite with two layers which is composed of a sheet layer and a curable resin layer or a film layer, 2) a composite with three layers which is composed of a sheet layer, a covering layer, and a curable resin layer or a film layer, or 3) a bonding sheet with two layers which is composed of a sheet layer and a covering layer.

Figure 1:
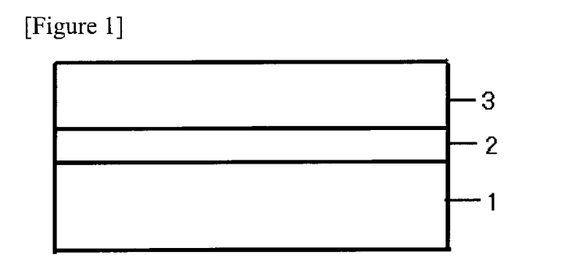
FIG. 1 shows a composite obtained by laminating a curable resin layer or a film layer on one surface of a sheet layer with a covering layer interposed therebetween.
Figure 2:
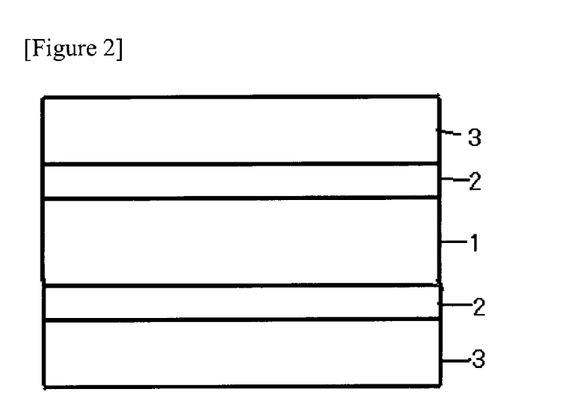
FIG. 2 shows a composite obtained by laminating a curable resin layer or a film layer on both surfaces of a sheet layer with a covering layer interposed therebetween.

The curable resin layer or the film layer can be laminated on one or both surfaces of the sheet layer. FIG. 1 shows a case where a curable resin layer or a film layer is laminated on one surface of a sheet layer with a covering layer interposed therebetween. FIG. 2 shows a case where a curable resin layer or a film layer is laminated on both surfaces of a sheet layer with a covering layer interposed therebetween.

[Sheet Layer (Nonwoven Fabric Layer)]

The sheet layer in the present invention contains as a main component fine fibers with an average fiber width of 2 to 1000 nm. The type of the fine fibers is not particularly limited as long as they are fine fibers with an average fiber width of 2 to 1000 nm. For example, fine cellulose fibers, fine fibers other than the fine cellulose fibers, or a mixture of fine cellulose fibers and fine fibers other than the fine cellulose fibers may be used. Preferably, the fine fibers are cellulose fibers.

The details of the fine cellulose fibers will be described later. Examples of fibers other than the fine cellulose fibers include, but are not particularly limited to, inorganic fibers, organic fibers, synthetic fibers, semisynthetic fibers, and regenerated fibers. Examples of inorganic fibers include, but are not limited to, glass fibers, rock fibers, and metal fibers. Examples of organic fibers include, but are not limited to, carbon fibers and fibers derived from natural products, such as chitin and chitosan. Examples of synthetic fibers include, but are not limited to, nylon, vinylon, vinylidene, polyester, polyolefin (e.g., polyethylene and polypropylene), polyurethane, acrylic, polyvinyl chloride, and aramid. Examples of semisynthetic fibers include, but are not limited to, acetate, triacetate, and promix. Examples of regenerated fibers include, but are not limited to, rayon, cupra, polynosic rayon, lyocell, and tencel. When fine cellulose fibers are used by being mixed with fine fibers other than the fine cellulose fibers, the fine fibers other than the fine cellulose fibers can be subjected to treatment such as chemical treatment and refining treatment, as appropriate. The fine fibers other than the fine cellulose fibers can be subjected to treatment such as chemical treatment and refining treatment after being mixed with the fine cellulose fibers, or can be mixed with the fine cellulose fibers after being subjected to treatment such as chemical treatment and refining treatment. When fine cellulose fibers are mixed with fine fibers other than the fine cellulose fibers, the amount of the added fine fibers other than the fine cellulose fibers is not particularly limited but is preferably less than or equal to 50 mass % of the total mass of the fine cellulose fibers and the fine fibers other than the fine cellulose fibers. The amount of the added fine fibers other than the fine cellulose fibers is preferably less than or equal to 40 mass %, further preferably, less than or equal to 30 mass %, and particularly preferably, less than or equal to 20 mass %.

<Fine Cellulose Fibers>

In the present invention, fine cellulose fibers that are obtained by subjecting a cellulose raw material to chemical treatment and refining treatment may be used as the fine fibers.

Examples of the cellulose raw material include, but are not particularly limited to, papermaking pulp; cotton pulp such as cotton linter and cotton lint; nonwood pulp such as hemp, straw, and bagasse; and cellulose isolated from sea squirt, seaweed, or the like. Among them, papermaking pulp is preferable in that it is easily available, though the present invention is not particularly limited thereto. Examples of papermaking pulp include, but are not particularly limited to, chemical pulp, semi-chemical pulp, mechanical pulp, nonwood pulp, and deinking pulp. Examples of chemical pulp include hardwood kraft pulp, softwood kraft pulp, sulfite pulp (SP), and soda pulp (AP). Herein, examples of hardwood kraft pulp include hardwood bleached kraft pulp (LBKP), hardwood unbleached kraft pulp (LUKP), and hardwood oxygen-bleached kraft pulp (LOKP). Examples of softwood kraft pulp include softwood bleached kraft pulp (NBKP), softwood unbleached kraft pulp (NUKP), and softwood oxygen-bleached kraft pulp (NOKP). Examples of semi-chemical pulp include semichemical pulp (SCP) and chemiground wood pulp (CGP). Examples of mechanical pulp include ground-wood pulp (GP) and thermomechanical pulp (TMP, BCTMP). Examples of nonwood pulp include those made from kozo (Broussonetia kazinoki), mitsumata, hemp, kenaf or the like as a raw material. Examples of deinking pulp include deinking pulp made from waste paper as a raw material. Among them, kraft pulp, deinking pulp, or sulfite pulp is preferable in that it is more easily available, though the present invention is not particularly limited thereto. The types of the cellulose raw material used may be either one or more than one.

The (number average) fiber width of the fine cellulose fibers is 2 to 1000 nm. More preferably, the number average fiber width is 2 to 100 nm. The fine cellulose fibers may also be cellulose fibers that are far thinner than typical pulp fibers used in papermaking applications, or rod-like grains. The fine cellulose fibers are an aggregate of cellulose molecules including crystalline portions, and their crystal structure is an I-type (non-parallel chains). The number average fiber width of the fine cellulose fibers can be observed and measured with an electron microscope. When the number average fiber width of the fine cellulose fibers is less than 2 nm, the fibers are dissolved in water as the cellulose molecules. Therefore, the physical properties (strength, rigidity, and dimensional stability) of the fine cellulose fibers are not exhibited. Herein, the fine cellulose fibers can be identified as having an I-type crystal structure as the fibers have typical peaks at two positions around $2\theta=14$ to $17°$ and $2\theta=22$ to $23°$ in the diffraction profile. The diffraction profile herein is a diffraction profile obtained from a wide-angle X-ray diffraction photograph that uses CuKα ($\lambda=1.5418$ Å) monochromatized with graphite. The measurement of the fiber widths of the fine cellulose fibers through electron microscope observation is conducted as follows. A water-based suspension of fine cellulose fibers with a concentration of 0.05 to 0.1 mass % is prepared, and then the suspension is cast onto a carbon-film-coated grid that has been subjected to hydrophilic treatment so that the suspension cast onto the grid is used as a sample for TEM observation. When the suspension contains fibers with large widths, it is also possible to observe a SEM image of the surface of the suspension cast onto glass. Electron microscope observation of an image is conducted at any of magnifications of ×1,000, 5,000×, 10,000×, or 50,000× in accordance with the widths of the contained fibers. It should be noted that the sample, observation conditions, and magnification are adjusted so as to satisfy the following conditions.

(1) A straight line X is drawn at any given position in the image being observed, and 20 or more fibers cross the straight line X.

(2) A straight line Y, which crosses the straight line X at right angles in the same image, is drawn, and 20 or more fibers cross the straight line Y.

On the image being observed that satisfies the aforementioned conditions, the widths of the fibers that cross the straight line X and the straight line Y are visually read. Then, at least three sets of images of surface potions where there is no overlap are observed, and the widths of the fibers that cross the straight line X and the straight line Y are read from each image. In this manner, the fiber widths of at least 20×2×3=120 fibers are read. The average fiber width of the fine cellulose fibers is the average value of the fiber widths read in this manner.

The fiber lengths of the fine cellulose fibers are not particularly limited, but are preferably 1 to 1000 μm, further preferably, 5 to 800 μm, or particularly preferably, 10 to 600 μm. When the fiber lengths are less than 1 μm, it becomes difficult to form a fine fiber sheet. When the fiber lengths are over 1,000 μm, the slurry viscosity of the fine fibers becomes extremely high, and thus, it becomes difficult to handle the fine fibers. The fiber lengths can be determined through image analysis using TEM, SEM, or AFM.

<Chemical Treatment>

The method of chemical treatment on the cellulose raw material or other fiber raw materials (e.g., inorganic fibers, organic fibers, synthetic fibers, semisynthetic fibers, and regenerated fibers) is not particularly limited as long as fine fibers can be obtained. Examples of the treatment method include ozonation treatment, TEMPO oxidation treatment, enzymatic treatment, and treatment with a compound that can form a covalent bond with the functional group in cellulose or fiber raw materials.

Examples of ozonation treatment include, but are not particularly limited to, a method described in JP 2010-254726 A. Specifically, after the fibers are subjected to ozonation treatment, the resulting fibers are dispersed in water, and then, the obtained water-based dispersion liquid of fibers is subjected to grinding treatment.

Examples of TEMPO oxidation treatment include, but are not particularly limited to, a method described in Biomacromolecules 8, 2485-2491, 2007 (Saito et al.).

Examples of enzymatic treatment include, but are not particularly limited to, a method described in WO2013/176033 A (the entire content of WO2013/176033 A is cited in the present specification). Specifically, it is possible to use a method of treating a fiber raw material with enzymes at least under the condition that the ratio of EG activity to CBHI activity of enzymes is 0.06 or greater.

Examples of treatment with a compound that can form a covalent bond with the functional group in cellulose or fiber raw materials include, but are not particularly limited to, the following methods:

(1) treatment with a quaternary-ammonium-group-containing compound described in JP 2011-162608 A;

(2) a method using a carboxylic-acid-based compound described in JP 2013-136859 A (the entire content of JP 2013-136859 A is cited in the present specification); and (3) a method using "at least one compound selected from the group consisting of an oxoacid, polyoxoacid, and salts thereof that have phosphorus atoms in the structure" described in WO2013/73652 A (the entire content of WO2013/73652 A is cited in the present specification).

The treatment with a quaternary-ammonium-group-containing compound described in JP 2011-162608 A is a method of reacting hydroxyl groups in a fiber with a quaternary-ammonium-group-containing cationization agent to cationically modify the fiber.

The method using a carboxylic-acid-based compound described in JP 2013-136859 A can be performed as follows. A fiber raw material is treated with at least one carboxylic-acid-based compound selected from the group consisting of a compound having two or more carboxy groups, acid anhydride of a compound having two or more carboxy groups, and derivatives thereof, thereby introducing the carboxy groups into the fiber raw material. Next, the fiber raw material with the carboxy groups introduced therein is treated with an alkaline solution.

The method of treating fiber raw materials using at least one compound (hereinafter referred to as Compound A) selected from the group consisting of an oxoacid, polyoxoacid, and salts thereof that have phosphorus atoms in the structure" described in WO2013/73652 A can be conducted as follows. That is, it is possible to use a method of mixing powder or an aqueous solution of Compound A into a fiber raw material, a method of adding an aqueous solution of Compound A into a slurry of a fiber raw material, and the like. Examples of Compound A include, but are not particularly limited to, phosphoric acid, polyphosphate, phosphorous acid, phosphonic acid, polyphosphonic acid, and esters thereof. Such compounds may also be in the form of salts. Examples of a compound having a phosphate group include, but are not particularly limited to, phosphoric acid, a sodium salt of phosphoric acid, a potassium salt of phosphoric acid, and an ammonium salt of phosphoric acid. Examples of a sodium salt of phosphoric acid include sodium dihydrogen phosphate, disodium hydrogenphosphate, trisodium phosphate, sodium pyrophosphate, and sodium metaphosphate. Examples of potassium salt of phosphoric acid include potassium dihydrogen phosphate, dipotassium hydrogen phosphate, tripotassium phosphate, potassium pyrophosphate, and potassium metaphosphate. Examples of an ammonium salt of phosphoric acid include ammonium dihydrogen phosphate, diammonium hydrogen phosphate, triammonium phosphate, ammonium pyrophosphate, and ammonium metaphosphate.

<Refining Treatment>

The cellulose raw material or other fiber raw materials (e.g., inorganic fibers, organic fibers, synthetic fibers, semi-synthetic fibers, and regenerated fibers) can be made into finer pieces by being subjected to refining treatment, whereby fine fibers with a number average fiber width of 2 to 1,000 nm can be obtained. In the refining treatment, a raw material obtained through the aforementioned chemical treatment is subjected to refining treatment using a refining treatment apparatus, whereby a dispersion liquid of fine fibers can be obtained.

As the refining treatment apparatus, a wet grinding apparatus or the like can be used as appropriate. Examples of the refining treatment apparatus include, but are not limited to, a grinder (millstone grinder), a high-pressure homogenizer, a ultrahigh-pressure homogenizer, a high-pressure collisional grinder, a ball mill, a disc type refiner, a conical refiner, a biaxial kneader, a vibration mill, a homo mixer rotated at a high speed, an ultrasonic disperser, and a beater.

The sheet layer of the present invention contains fine fibers as a main component. As a sheet used for the sheet layer, for example, a nonwoven fabric, a woven fabric, paper, or a film can be used without particular limitation. The content of the fine fibers in the sheet layer, with respect to the dry weight of the sheet layer, is preferably greater than or equal to 50 mass %, further preferably, greater than or equal to 60 mass %, more preferably, greater than or equal to 70 mass %, and particularly preferably, greater than or equal to 80 mass %. The higher the content of the fine fibers in the sheet layer, the stronger the sheet that can be obtained.

<Physical Property of Sheet Layer>

The density of the sheet layer in the present invention is not particularly limited, but is preferably greater than or equal to 0.90 $g/cm^3$, more preferably, greater than or equal to 1.00 $g/cm^3$, and further preferably, greater than or equal to 1.10 $g/cm^3$. The upper limit of the density of the sheet layer is not particularly limited, but is typically less than or equal to 1.60 $g/cm_3$.

The thickness of the sheet layer in the present invention is not particularly limited, but is typically about 1 to 300 μm, preferably, 2 to 150 μm, more preferably, 5 to 100 μm, or further preferably, 5 to 50 μm.

It should be noted that the sheet layer may include a plurality of sheet layers laminated in accordance with the intended use. When a plurality of sheet layers are used, the total thickness and the total density of such sheet layers is preferably in the aforementioned range.

[Formation of Sheet Layer]

In forming a sheet layer, a suspension containing fine fibers is prepared. The suspension may also contain a hydrophilic polymer added thereto. Examples of a hydrophilic polymer include, but are not particularly limited to, polyethylene glycol, cellulose derivatives (e.g., hydroxyethylcellulose, carboxyethyl cellulose, and carboxymethyl cellulose), casein, dextrin, starch, modified starch, polyvinyl alcohol, modified polyvinyl alcohol (e.g., acetoacetylated polyvinyl alcohol), polyethylene oxide, polyvinyl pyrrolidone, polyvinyl methyl ether, polyacrylates, polyacrylamide, acrylic alkyl ester copolymer, and urethane-based copolymer.

Alternatively, it is also possible to use a hydrophilic low-molecular weight compound instead of the hydrophilic polymer. Examples of a hydrophilic low-molecular weight compound include, but are not particularly limited to, glycerin, erythritol, xylitol, sorbitol, galactitol, mannitol, ethylene glycol, diethylene glycol, propylene glycol, dipropylene glycol, and butylene glycol. When a hydrophilic polymer or a hydrophilic low-molecular weight compound is added, the amount of addition of such a compound is not particularly limited, but is preferably 1 to 200 parts by mass, more preferably, 1 to 150 parts by mass, further preferably, 2 to 120 parts by mass, and particularly preferably, 3 to 100 parts by mass with respect to 100 parts by mass of the solid content of fine fibers.

The suspension containing fine fibers to be applied to a substrate is a liquid containing fine fibers and a dispersion medium. As the dispersion medium, water or an organic solvent can be used. Preferably, water is used alone in terms of usability and cost, though the present invention is not particularly limited thereto. Even when an organic solvent is used, it is preferably used in combination with water, though the present invention is not particularly limited thereto. Examples of an organic solvent used in combination with water include, but are not particularly limited to, polar solvents such as alcohols, ketones, ethers, and acetate-based solvents. Examples of alcohols include methanol, ethanol, propanol, and butanol. Examples of ketones include acetone and methyl ethyl ketone. Examples of ethers include diethyl ether, ethylene glycol dimethyl ether, and tetrahydrofuran. Examples of acetate-based solvents include ethyl acetate.

The concentration of the solid content of the fine fibers in the suspension is not particularly limited, but is preferably 0.1 to 20 mass %, more preferably, 0.1 to 10 mass %, and further preferably, 0.5 to 10 mass %. As long as the concentration of the solid content after dilution is greater than or equal to the lower limit, the efficiency of the refining treatment is improved, and as long as the concentration of the solid content after dilution is less than or equal to the upper limit, occlusion in the refining treatment apparatus can be prevented.

The sheet layer can be prepared by applying a suspension containing fine fibers onto a substrate. As the substrate, a sheet-like object as typified by a film, a woven fabric, or a nonwoven fabric; a plate; or a cylindrical body can be used, though the present invention is not particularly limited thereto. As the material of the substrate, resin, metal, paper, or the like is used, for example. It is preferable to use resin or paper in that such a material can produce a sheet containing fine fibers more easily, though the present invention is not particularly limited thereto. Examples of resin include, but are not particularly limited to, polytetrafluoroethylene, polyethylene, polypropylene, polyethylene terephthalate, polyvinyl chloride, polyvinylidene chloride, polystyrene, and acrylic resin. Examples of metal include, but are not particularly limited to, aluminum, stainless steel, zinc, iron, and brass. Examples of a paper substrate include, but are not particularly limited to, paper substrates such as one-side glazed paper, woodfree paper, wood containing paper, copy paper, art paper, coated paper, kraft paper, paper board, white lined board, newsprint, and woody paper.

As a coating machine for applying a suspension containing fine fibers, it is possible to use a roll coater, a gravure coater, a die coater, a curtain coater, or an air doctor coater, for example, though the present invention is not particularly limited thereto. The die coater, the curtain coater, or the spray coater is preferable as a uniform thickness can be achieved by such a coater, and the die coater is more preferable, though the present invention is not particularly limited thereto.

The coating temperature is not particularly limited, but it is preferably 10 to 80° C., or further preferably, 10 to 60° C. As long as the coating temperature is greater than or equal to the lower limit, it is possible to easily apply a suspension containing fine fibers, and as long as the coating temperature is less than or equal to the upper limit, it is possible to suppress vaporization of the dispersion medium during coating.

The suspension containing fine fibers that has been applied onto the substrate is dried to form a nonwoven fabric layer. The drying method is not particularly limited, and thus may be any of a non-contact drying method, a method of drying the suspension while restraining the sheet, or a combination of such methods.

The non-contact drying method is not particularly limited, but it is possible to use a method of drying the suspension while applying heat using heated air, infrared rays, far infrared rays, or near infrared rays (heating drying method) or a method of drying the suspension in a vacuum (vacuum drying method). Although the heating drying method may be combined with the vacuum drying method, the heating drying method is typically used. Drying that uses infrared rays, far infrared rays, or near infrared rays can be conducted using an infrared device, a far infrared ray device, or a near infrared ray device, though the present invention is not particularly limited thereto. The heating temperature when the heating drying method is used is not particularly limited, but it is preferably 40 to 120° C., or more preferably, 40 to 105° C. As long as the heating temperature is set to greater than or equal to the lower limit, it is possible to cause the dispersion medium to evaporate rapidly, and as long as the heating temperature is set to less than or equal to the upper limit, it is possible to suppress the cost required for heating and suppress discoloration due to heat of the fine fibers.

[Covering Layer (Easily Adhesive Layer)]

The components of the covering layer are not particularly limited. For example, a hybrid material of an inorganic component and an organic component, heat-curable resin, photo-curable resin, or thermoplastic resin can be used. Examples of the resin include polyester resin, urethane resin, acrylic resin, olefin resin, fluorine resin, vinyl chloride resin, styrene resin, epoxy resin, and silicone resin. As the components of the covering layer, a hybrid material of an inorganic component and an organic component is preferably used. The types of the hybrid material of an inorganic component and an organic component or resin used may be either one or more than one. It is also possible to use the hybrid material of an inorganic component and an organic component and resin in combination. Alternatively, it is also possible to use an adhesive, an adhesive sheet, or the like as the covering layer.

Examples of the hybrid material of an inorganic component and an organic component include a composite of an organic component and an inorganic component having a silicone skeleton for the covering layer. The hybrid material of an inorganic component and an organic component which has a silicone skeleton include silsesquioxane.

Silsesquioxane is a network-type polymer or a polyhedral cluster having a structure represented by $(RSiO_{3/2})n$ (R in the formula represents an organic group). By introducing a reactive substituent group into R, a hardened hybrid material of an inorganic component and an organic component can be produced using the reactive substituent group. As the structure of silsesquioxane, a random structure, a complete cage structure, an incomplete cage structure, a ladder structure, and the like are known. As silsesquioxane, it is possible to use COMPOCERAN SQ100 series produced by ARAKAWA CHEMICAL INDUSTRIES, LTD., photo-curable SQ series produced by TOAGOSEI CO., LTD., polysilsesquioxane SR series produced by Konishi Chemical Ind. Co., Ltd., or the like, though the present invention is not particularly limited thereto.

Examples of an organic component that forms the hybrid material of an inorganic component and an organic component include at least one component selected from the group consisting of a methyl group, a mercapto group, a methacryl group, an acryloyl group, a vinyl group, and an amino group. As specific examples of the organic component, amine and the like can be used.

Using the components that form the covering layer, it is possible to produce a composite in which the adhesion between a sheet layer and a curable resin layer or a film layer (1: a sheet layer and a curable resin layer, 2: a sheet layer and a film layer) is high.

The organic component contained in the hybrid material of the inorganic component and the organic component can be easily bonded to the curable resin layer or the film layer, while the inorganic component contained in the hybrid material can be easily bonded to the sheet layer. Therefore, high adhesion is obtained between the sheet layer and the curable resin layer or the film layer. Using the hybrid material of the inorganic component and the organic component as the component of the covering layer, it is possible to produce a composite that has high strength and is unlikely to crack.

Examples of a method for bonding the sheet layer and the covering layer together include, but are not particularly limited to, coating and bonding. When the sheet layer and the covering layer are bonded together by coating, it is possible to form the covering layer by coating the sheet layer with a solution containing components to form the covering layer, and then curing the solution as appropriate. Examples of the curing method include, but are not limited to, a thermal curing method and a curing method using radiation exposure. Examples of radiation include, but are not limited to, infrared rays, visible rays, and ultraviolet rays. When a thermal curing method is used, a thermal polymerization initiator may be used, for example, and any method is acceptable without particular limitation as long as curing can be performed. Alternatively, it is also possible to bond the sheet layer and the covering layer together using an adhesive, an adhesive including an adhesive and a release sheet (in use, the release sheet that covers the adhesive is released so that the adhesive can be used; (example) product name: Non-carrier tape), an adhesive sheet, or the like.

The thickness of the covering layer in the present invention is not particularly limited, but is typically about 0.1 to 50 μm, preferably, 0.1 to 30 μm, more preferably, 0.2 to 20 μm, or further preferably, 0.5 to 10 μm.

The covering layer may also be formed in two layers. When the covering layer is formed in a plurality of layers, the total thickness of the plurality of covering layers is preferably in the aforementioned range.

[Curable Resin Layer or Film Layer (Resin Layer)]

The components that form the curable resin layer or the film layer are not particularly limited, but thermoplastic resin, heat-curable resin, photo-curable resin, or the like can be used. As the components that form the curable resin layer or the film layer, it is desirable to use components having a barrier property against humidity, water, heat, gas, and the like. The curable resin layer or the film layer may also be formed by laminating at least two layers.

Examples of thermoplastic resin include, but are not particularly limited to, styrene resin, acrylic resin, aromatic polycarbonate resin, aliphatic polycarbonate resin, aromatic polyester resin, aliphatic polyester resin, aliphatic polyolefin resin, cyclic olefin resin, polyamide resin, polyphenylene ether resin, thermoplastic polymide resin, polyacetal resin, polysulfone resin, and amorphous fluorine resin.

Examples of heat-curable resin include, but are not particularly limited to, epoxy resin, acrylic resin, oxetane resin, phenol resin, urea resin, melamine resin, unsaturated polyester resin, silicone resin, polyurthane resin, allylic ester resin, and diallyl phthalate resin.

Examples of photo-curable resin include, but are not limited to, precursors of epoxy resin, acrylic resin, and oxetane resin.

The types of resin used may be either one or more than one.

It should be noted that among the aforementioned thermoplastic resin, heat-curable resin, and photo-curable resin, photo-curable resin is the most preferable.

Examples of a curing agent for heat-curable resin include, but are not particularly limited to, multifunctional amine, polyamide, acid anhydride, and phenol resin. In addition, examples of a curing catalyst for heat-curable resin include, but are not particularly limited to, imidazole. The types of the curing agent or the curing catalyst used may be either one or more than one.

Examples of the method for bonding the sheet layer and the curable resin layer or the film layer together and the method for boding the sheet layer and the curable resin layer or the film layer together with a covering layer interposed therebetween include, but are not particularly limited to, coating and bonding. When the curable resin layer or the film layer is bonded to the sheet layer by coating, it is possible to form the curable resin layer or the film layer by coating the sheet layer with a solution containing a resin precursor and a curing agent, and then curing the solution. Examples of the curing method include, but are not limited to, a thermal curing method and a curing method using radiation exposure. Examples of radiation include, but are not limited to, infrared rays, visible rays, and ultraviolet rays. When a thermal curing method is used, a thermal polymerization initiator may be used, for example, and any method is acceptable without particular limitation as long as curing can be performed.

Meanwhile, when the curable resin layer or the film layer is bonded to the sheet layer with a covering layer interposed therebetween by coating, it is possible to, after coating the sheet layer with the covering layer, form the curable resin layer or the film layer on the covering layer with a similar method to the aforementioned method.

Alternatively, it is also possible to bond the sheet layer and the curable resin layer or the film layer together using an adhesive, an adhesive including an adhesive and a release sheet (in use, the release sheet that covers the adhesive is released so that the adhesive can be used; (example) product name: Non-carrier tape), an adhesive sheet, or the like.

The thickness of the curable resin layer or the film layer in the present invention is not particularly limited, but is typically about 0.1 to 100 μm, preferably, 0.2 to 50 μm, more preferably, 0.5 to 20 μm, or further preferably, 1 to 10 μm.

The curable resin layer or the film layer may also be formed by laminating a plurality of curable resin layers or film layers in accordance with the intended use. When a plurality of curable resin layers or film layers are used, the total thickness of the plurality of curable resin layers or film layers is preferably in the aforementioned range.

Laminating a curable resin layer or a film layer having a barrier property against water on the sheet layer with the aforementioned method, for example, it is possible to improve the barrier property of the sheet layer against water.

[Composite (Composite of Nonwoven Fabric and Resin)]

The composite of the present invention is 1) a composite (with two layers) obtained by laminating a curable resin layer or a film layer on a sheet layer, 2) a composite (with three layers) obtained by laminating a curable resin layer or a film layer on a sheet layer with a covering layer interposed therebetween, or 3) a bonding sheet (with two layers) obtained by laminating a covering layer on a sheet layer.

1) The composite (with two layers) obtained by laminating a curable resin layer or a film layer on a sheet layer has the characteristics of high strength and high transparency. 2) The composite (with three layers) obtained by laminating a curable resin layer or a film layer on a sheet layer with a covering layer interposed therebetween has the characteristics of high strength, high transparency, and high adhesion between the sheet layer and the curable resin layer or the film layer. 3) The bonding sheet (with two layers) obtained by laminating a covering layer on a sheet layer has the characteristics of high strength, high transparency, and high adhesion between the sheet layer and the covering layer.

The adhesion between each of the adjacent layers of the aforementioned composite and the bonding sheet, in terms of the number of peeled cells out of 100 cells in the cross-cut tests conducted in accordance with JIS K 5400 described in the following experimental examples, is preferably less than or equal to 10, more preferably, less than or equal to 5, or further preferably, less than or equal to 3.

In addition, the composite and the bonding sheet of the present invention have the characteristic of high transparency. The total luminous transmittance of the composite of the present invention is preferably greater than or equal to 70%, more preferably, greater than or equal to 80%, further preferably, greater than or equal to 85%, or even preferably, greater than or equal to 90%. The upper limit of the total luminous transmittance is not particularly limited, and may be 100%, or less than or equal to 99%. The haze of the composite of the present invention is preferably less than or equal to 10%, more preferably, less than or equal to 5%, or further preferably, less than or equal to 3%.

[Applications of Composite (Applications of Nonwoven Fabric-Resin Composite)]

The composite and the bonding sheet of the present invention can be used for an image display device such as a liquid crystal display, a plasma display, an organic EL display, a field emission display, or a rear projection television. Further, the composite of the present invention can also be used for an illumination device or a projection device. Furthermore, the composite and the bonding sheet of the present invention can be used for a wiring substrate or a front plate of a touch panel or a solar cell (e.g., silicon-based solar cell or a dye-sensitized solar cell), a color filter substrate, or the like. When applied as a substrate, the composite or the bonding sheet of the present invention may also be laminated with a barrier film, ITO, TFT, or the like.

Although the present invention will be described in further detail below by means of the following experimental examples, the present invention should not be limited by such experimental examples.

EXAMPLES

Experimental Example 1

(1) Formation of Sheet Layer (A) (which is also referred to as "Nonwoven Fabric Layer (A)")

A sheet layer (nonwoven fabric layer) was produced with the following method using a nonwoven fabric as a sheet.

265 g sodium dihydrogenphosphate dehydrate and 197 g disodium hydrogenphosphate were dissolved in 538 g water to obtain an aqueous solution of a phosphate compound (hereinafter referred to as a "phosphorylation reagent").

Softwood bleached kraft pulp (produced by Oji Paper Co., Ltd., which contains 50 mass % moisture and has a Canadian standard freeness (CSF) of 700 ml measured in accordance with JIS P8121) was diluted with ion-exchanged water so that the moisture content became 80 mass %, whereby a pulp suspension was obtained. Then, the 210 g phosphorylation reagent was added to the 500 g pulp suspension, and drying was performed while the mixture was kneaded sometimes with an air blowing dryer at 105° C. until a constant mass was obtained. Next, the mixture was heated for 1 hour while being kneaded sometimes with an air blowing dryer at 150° C., so that a phosphate group was introduced into the cellulose.

Next, 5000 ml ion-exchanged water was added to the cellulose with the phosphate group introduced thereinto, and then, agitation mixing was performed, followed by dehydration. The pulp after the dehydration was diluted with 5000 ml ion-exchanged water and then, a 1N aqueous sodium hydroxide solution was added thereto little by little while the mixture was agitated until a pH of 12 to 13 was obtained, whereby a pulp suspension was obtained. After that, the pulp suspension was dehydrated and 5000 ml ion-exchanged water was added thereto to perform washing. Such dehydration washing was repeated once again.

Ion-exchanged water was added to the pulp obtained after the dehydration washing, whereby a 1.0 mass % pulp suspension was obtained. The pulp suspension was passed through a high-pressure homogenizer ("Panda Plus 2000" produced by NiroSoavi) 5 times at an operation pressure of 1200 bar, whereby a fine fiber cellulose suspension (1) was obtained. Further, the suspension was passed through a wet-type atomization apparatus ("Altimizer" produced by SUGINO MACHINE LIMITED) 5 times at a pressure of 245 MPa, whereby a fine fiber cellulose suspension (2) was obtained. The average fiber width of the fine fiber cellulose was 4.2 nm.

Polyethylene glycol (produced by Wako Pure Chemical Industries, Ltd., which has a molecular weight of 4,000,000) was added to the fine fiber cellulose suspension (2) so that the content of polyethylene glycol became 15 parts by mass with respect to 100 parts by mass of the fine fiber cellulose. It should be noted that the concentration was adjusted such that the concentration of the solid content became 0.5 mass %. The amount of the suspension was calculated to obtain nonwoven fabric with a basis weight of 37.5 g/m$^2$, and the suspension was then developed on the commercially available acrylic plate and dried in an oven at 50° C. It should be noted that a damming plate was disposed on the acrylic plate to obtain a predetermined basis weight so that a square nonwoven fabric would be able to be obtained. Through the aforementioned procedure, a nonwoven fabric layer (A) was obtained (the content of the fine fiber cellulose in the nonwoven fabric layer was 86.9 mass %). The thickness and the density of the obtained nonwoven fabric layer (A) were 25 μm and 1.49 g/cm$^3$, respectively.

(2) Formation of Covering Layer (B)

76 parts by weight of an anchoring agent for UV coating, which is polyester resin ("ARACOAT AP2510" produced by Arakawa Chemical Industries, Ltd., which has a solid content of 30 mass %), 10 parts by weight of a curing agent ("ARACOAT CL2502" produced by Arakawa Chemical Industries, Ltd., which has a solid content of 20 mass %), and 14 parts by weight of methyl ethyl ketone were mixed to obtain an easily adhesive coating liquid. Next, one surface of the nonwoven fabric layer (A) was coated with the easily adhesive coating liquid using a Meyer rod. After that, drying was performed at 100° C. for 3 minutes to cure the easily adhesive coating liquid so that a covering layer (B) with a thickness of 1 μm was formed. Through the aforementioned procedure, a composite having the nonwoven fabric layer (A) and the covering layer (B) was obtained.

(3) Formation of Resin Layer (C)

80 parts by weight of an acrylic resin composition ("Beamset 381" produced by Arakawa Chemical Industries, Ltd.) and 20 parts by weight of methyl ethyl ketone were mixed to obtain a curable resin precursor solution. The covering layer (B) of the composite having the nonwoven fabric layer (A) and the covering layer (B) was coated with the aforementioned curable resin precursor solution using a Meyer rod. Next, the layer was irradiated with ultraviolet rays of 300 mJ/cm$^2$ using a UV conveyor system ("ECS-4011GX" produced by EYE GRAPHICS CO., LTD.) so that the curable resin precursor solution was cured and a resin layer (C) with a thickness of 2.5 μm was thus formed. Through the aforementioned procedure, a composite was obtained in which the resin layer (C) was laminated on one surface of the nonwoven fabric layer (A) with the covering layer (B) interposed therebetween.

Experimental Example 2

(1) Formation of Covering Layer (B)

After the covering layer (B) was formed on one surface of the nonwoven fabric layer (A) in (2) of Experimental Example 1, a covering layer (B) with a thickness of 1.0 μm was also formed on the other surface through a similar procedure, whereby a composite having the nonwoven fabric layer (A) and the covering layers (B) was obtained.

(2) Formation of Resin Layer (C)

A resin layer (C) with a thickness of 2.5 μm was formed on one surface of the composite having the nonwoven fabric layer (A) and the covering layer (B) through a similar procedure to that in (3) of Experimental Example 1. Further, a resin layer (C) with a thickness of 2.5 μm was also formed on the other surface through a similar procedure. Thorough the aforementioned procedure, a composite was obtained in which the resin layer (C) was laminated on both surfaces of the nonwoven fabric layer (A) with the covering layer (B) interposed therebetween.

Experimental Example 3

50 parts by weight of an urethane acrylate resin composition ("Beamset 575CB" produced by Arakawa Chemical Industries, Ltd.) and 50 parts by weight of methyl ethyl ketone were mixed to obtain a curable resin precursor solution. One surface of the composite which is composed of the nonwoven fabric layer (A) and the covering layer (B) obtained in (1) of Experimental Example 2 was coated with the aforementioned curable resin precursor solution using a Meyer rod. Next, the layer was dried at 80° C. for 3 minutes and then irradiated with ultraviolet rays of 300 mJ/$cm^2$ using a UV conveyor system ("ECS-4011GX" produced by EYE GRAPHICS CO., LTD.) so that the curable resin precursor solution was cured and a resin layer (C) with a thickness of 2.5 μm was thus formed. Further, a resin layer (C) with a thickness of 2.5 μm was also formed on the other surface through a similar procedure. Through the aforementioned procedure, a composite was obtained in which the resin layer (C) was laminated on both surfaces of the nonwoven fabric layer (A) with the covering layer (B) interposed therebetween.

Experimental Example 4

40 parts by weight of an acrylic resin composition ("ADEKA OPTOMER HC500-60" produced by ADEKA CORPORATION) and 60 parts by weight of methyl ethyl ketone were mixed to obtain a curable resin precursor solution. One surface of the composite which is composed of the nonwoven fabric layer (A) and the covering layer (B) obtained in (1) of Experimental Example 2 was coated with the aforementioned curable resin precursor solution using a Meyer rod. Next, the layer was dried at 100° C. for 2 minutes and then irradiated with ultraviolet rays of 300 mJ/$cm^2$ using a UV conveyor system ("ECS-4011GX" produced by EYE GRAPHICS CO., LTD.) so that the curable resin precursor solution was cured and a resin layer (C) with a thickness of 2.5 μm was thus formed. Further, a resin layer (C) with a thickness of 2.5 μm was also formed on the other surface through a similar procedure. Through the aforementioned procedure, a composite was obtained in which the resin layer (C) was laminated on both surfaces of the nonwoven fabric layer (A) with the covering layer (B) interposed therebetween.

Experimental Example 5

In Experimental Example 4, the thickness of the nonwoven fabric layer (A) was set to 50 μm (and a density of 1.47 g/$cm^3$). Other than that, through a similar procedure to that in Experimental Example 4, a composite was obtained in which the resin layer (C) was laminated on both surfaces of the nonwoven fabric layer (A) with the covering layer (B) interposed therebetween.

Experimental Example 6

In Experimental Example 4, the thickness of the nonwoven fabric layer (A) was set to 75 μm (and a density of 1.46 g/$cm^3$). Other than that, through a similar procedure to that in Experimental Example 4, a composite was obtained in which the resin layer (C) was laminated on both surfaces of the nonwoven fabric layer (A) with the covering layer (B) interposed therebetween.

Experimental Example 7

In Experimental Example 6, the thickness of the resin layer (C) formed on both surfaces of the composite which is composed of the nonwoven fabric layer (A) and the covering layer (B) was set to 10 μm. Other than that, through a similar procedure to that in Experimental Example 6, a composite was obtained in which the resin layer (C) was laminated on both surfaces of the nonwoven fabric layer (A) with the covering layer (B) interposed therebetween.

Experimental Example 8

In Experimental Example 6, the thickness of the resin layer (C) formed on both surfaces of the composite which is composed of the nonwoven fabric layer (A) and the covering layer (B) was set to 20 μm. Other than that, through a similar procedure to that in Experimental Example 6, a composite was obtained in which the resin layer (C) was laminated on both surfaces of the nonwoven fabric layer (A) with the covering layer (B) interposed therebetween.

Experimental Example 9

(1) Formation of Covering Layer (B)

26 parts by weight of silsesquioxane ("COMPOCERAN SQ107" produced by ARAKAWA CHEMICAL INDUSTRIES, LTD.), 14 parts by weight of a curing agent ("HBSQ201" produced by Arakawa Chemical Industries, Ltd.), and 60 parts by weight of isopropyl alcohol were mixed to obtain an adhesive coating liquid. Next, one surface of the nonwoven fabric layer (A) obtained in (1) of Experimental Example 1 was coated with the adhesive coating liquid using a Meyer rod. After that, the layer was dried at 100° C. for 3 minutes and then irradiated with ultraviolet rays of 300 mJ/$cm^2$ using a UV conveyor system ("ECS-4011GX" produced by EYE GRAPHICS CO., LTD.) so that the adhesive coating liquid was cured and a covering layer (B) with a thickness of 2.5 μm was thus formed. Further, a covering layer with a thickness of 2.5 μm was also formed on the other surface through a similar procedure. Through the aforementioned procedure, a composite which is composed of the nonwoven fabric layer (A) and the covering layer (B) was obtained.

(2) Formation of Resin Layer (C)

40 parts by weight of an acrylic resin composition ("ADEKA OPTOMER HC500-60" produced by ADEKA CORPORATION) and 60 parts by weight of methyl ethyl ketone were mixed to obtain a curable resin precursor solution. One surface of the composite which is composed of the nonwoven fabric layer (A) and the covering layer (B) was coated with the aforementioned curable resin precursor solution using a Meyer rod. Next, the layer was dried at 100° C. for 2 minutes and then irradiated with ultraviolet rays of 300 mJ/cm$^2$ using a UV conveyor system ("ECS-4011GX" produced by EYE GRAPHICS CO., LTD.) so that the curable resin precursor solution was cured and a resin layer (C) with a thickness of 2.5 µm was thus formed. Further, a resin layer (C) with a thickness of 2.5 µm was also formed on the other surface through a similar procedure. Through the aforementioned procedure, a composite was obtained in which the resin layer (C) was laminated on both surfaces of the nonwoven fabric layer (A) with the covering layer (B) interposed therebetween.

Experimental Example 10

In Experimental Example 9, the thickness of the covering layer (B) formed on both surfaces of the nonwoven fabric layer (A) was set to 5.0 µm. In addition, the thickness of the resin layer (C) formed on both surfaces of the composite which is composed of the nonwoven fabric layer (A) and the covering layer (B) was set to 10 µm. Other than that, through a similar procedure to that in Experimental Example 9, a composite was obtained in which the resin layer (C) was laminated on both surfaces of the nonwoven fabric layer (A) with the covering layer (B) interposed therebetween.

Experimental Example 11

In Experimental Example 10, the thickness of the nonwoven fabric layer (A) was set to 130 µm (and a density of 1.42 g/cm$^3$). Other than that, through a similar procedure to that in Experimental Example 10, a composite was obtained in which the resin layer (C) was laminated on both surfaces of the nonwoven fabric layer (A) with the covering layer (B) interposed therebetween.

Experimental Example 12

In Experimental Example 11, the thickness of the resin layer (C) formed on both surfaces of the composite which is composed of the nonwoven fabric layer (A) and the covering layer (B) was set to 40 µm. It should be noted that in Formation of the resin layer (C), coating was performed using a film applicator in order to increase the amount of the curable resin precursor solution applied and thus obtain a predetermined thickness. Other than that, through a similar procedure to that in Experimental Example 11, a composite was obtained in which the resin layer (C) was laminated on both surfaces of the nonwoven fabric layer (A) with the covering layer (B) interposed therebetween.

Experimental Example 13

In Experimental Example 12, the thickness of the covering layer (B) formed on both surfaces of the nonwoven fabric layer (A) was set to 25 µm. It should be noted that in formation of the covering layer (B) and the resin layer (C), coating was performed using a film applicator in order to increase the amounts of the easily adhesive coating liquid and the curable resin precursor solution applied and thus obtain predetermined thicknesses. Other than that, through a similar procedure to that in Experimental Example 12, a composite was obtained in which the resin layer (C) was laminated on both surfaces of the nonwoven fabric layer (A) with the covering layer (B) interposed therebetween.

Experimental Example 14

The resin layer (C) with a thickness of 2.5 µm was formed on one surface of the nonwoven fabric layer (A) obtained in (1) of Experimental Example 1, through a similar procedure to that in (3) of Experimental Example 1. Further, a resin layer (C) with a thickness of 2.5 µm was also formed on the other surface through a similar procedure. Through the aforementioned procedure, a composite was obtained in which the resin layer (C) was directly laminated on both surfaces of the nonwoven fabric layer (A).

Experimental Example 15

One surface of the nonwoven fabric layer (A) obtained in (1) of Experimental Example 1 was coated with a curable resin precursor solution obtained by mixing 40 parts by weight of an acrylic resin composition ("ADEKA OPTOMER HC500-60" produced by ADEKA CORPORATION) and 60 parts by weight of methyl ethyl ketone, using a Meyer rod. Next, the layer was dried at 100° C. for 2 minutes and then irradiated with ultraviolet rays of 300 mJ/cm$^2$ using a UV conveyor system ("ECS-4011GX" produced by EYE GRAPHICS CO., LTD.) so that the curable resin precursor solution was cured and a resin layer (C) with a thickness of 2.5 µm was thus formed. Further, a resin layer (C) with a thickness of 2.5 µm was also formed on the other surface through a similar procedure. Through the aforementioned procedure, a composite was obtained in which the resin layer (C) was directly laminated on both surfaces of the nonwoven fabric layer (A).

Experimental Example 16

In (1) of Experimental Example 1, the nonwoven fabric layer (A) was obtained in a similar manner to that in (1) of Experimental Example 1 except that polyethylene glycol (produced by Wako Pure Chemical Industries, Ltd., which has a molecular weight of 4,000,000) was added so that the content of polyethylene glycol became 150 parts by mass with respect to 100 parts by mass of the fine fiber cellulose (the content of the fine fiber cellulose in the nonwoven fabric layer was 40 mass %). Next, the resin layer (C) with a thickness of 2.5 µm was formed through a similar procedure to that in (3) of Experimental Example 1. Further, a resin layer (C) with a thickness of 2.5 µm was also formed on the other surface through a similar procedure. Through the aforementioned procedure, a composite was obtained in which the resin layer (C) was directly laminated on both surfaces of the nonwoven fabric layer (A).

<Evaluation Method>

The composite bodies produced in the aforementioned experimental examples were evaluated in accordance with the following evaluation method. Table 1 shows the evaluation results.

(1) Evaluation of Adhesion (Cross-Cut Tests)

In accordance with JIS K 5400, 100 cross cuts each having a size of 1 mm$^2$ were made on the surface of each composite, and cellotapes (produced by Nichiban Co., Ltd.) were stuck thereto, and then, pressure with a load of 1.5 kg/cm² was applied and the cellotapes were peeled off in the direction of 90°. The adhesion between the nonwoven fabric layer (A) and the resin layer (C) was evaluated based on the number of peeled cells.

(2) Total Luminous Transmittance of Composite

In accordance with JIS K 7105, the total luminous transmittance was measured using C light with a haze meter ("HM-150" produced by Suga Test Instruments Co., Ltd.).

(3) Haze of Composite

In accordance with JIS K 7136, the haze value was measured using C light with a haze meter ("HM-150" produced by Suga Test Instruments Co., Ltd.).

(4) Modulus of Elasticity in Tension

In accordance with JIS P 8113, the modulus of elasticity in tension was measured using a tension tester ("Fracture Toughness Tester SE-064" produced by Lenhardt & Wagner).

TABLE 1

|  | Experimental Example 1 | Experimental Example 2 | Experimental Example 3 | Experimental Example 4 | Experimental Example 5 | Experimental Example 6 | Experimental Example 7 | Experimental Example 8 |
|---|---|---|---|---|---|---|---|---|
| Density (g/cm³) of Nonwoven Fabric (A) | 1.49 | 1.49 | 1.49 | 1.49 | 1.47 | 1.46 | 1.46 | 1.46 |
| Surface (one or Both) Coated with Covering Layer (B) and/or Resin Layer (C) | One Surface | Both Surfaces | Both Surfaces | Both Surfaces | Both Surfaces | Both Surfaces | Both Surfaces | Both Surfaces |
| Thickness (μm) of Nonwoven Fabric Layer (A) | 25 | 25 | 25 | 25 | 50 | 75 | 75 | 75 |
| Thickness of Covering Layer (B) (μm/One Surface) | 1.0 | 1.0 | 1.0 | 1.0 | 1.0 | 1.0 | 1.0 | 1.0 |
| Thickness of Resin Layer (C) (μm/One Surface) | 2.5 | 2.5 | 2.5 | 2.5 | 2.5 | 2.5 | 10 | 20 |
| Adhesion of Resin Layer (C) (Number of Peeled Cells) | 0/100 | 0/100 | 0/100 | 0/100 | 0/100 | 0/100 | 0/100 | 0/100 |
| Total Luminous Transmittance (%) | 91.5 | 91.9 | 91.5 | 91.6 | 91.3 | 91 | 90.8 | 90.8 |
| Haze (%) | 1.8 | 1 | 0.9 | 1.3 | 1.6 | 2 | 2.4 | 2.4 |
| Modulus of Elasticity in Tension (Mpa) | 10.6 | 9.8 | 9.7 | 9.8 | 10.7 | 11 | 9.9 | 8.9 |

|  | Experimental Example 9 | Experimental Example 10 | Experimental Example 11 | Experimental Example 12 | Experimental Example 13 | Experimental Example 14 | Experimental Example 15 | Experimental Example 16 |
|---|---|---|---|---|---|---|---|---|
| Density (g/cm³) of Nonwoven Fabric (A) | 1.46 | 1.49 | 1.42 | 1.42 | 1.42 | 1.49 | 1.49 | 1.49 |
| Surface (one or Both) Coated with Covering Layer (B) and/or Resin Layer (C) | Both Surfaces | Both Surfaces | Both Surfaces | Both Surfaces | Both Surfaces | Both Surfaces | Both Surfaces | Both Surfaces |
| Thickness (μm) of Nonwoven Fabric Layer (A) | 25 | 25 | 130 | 130 | 130 | 25 | 25 | 25 |
| Thickness of Covering Layer (B) (μm/One Surface) | 2.5 | 5.0 | 5.0 | 5.0 | 25.0 | — | — | — |
| Thickness of Resin Layer (C) (μm/One Surface) | 2.5 | 10 | 10 | 40 | 40 | 2.5 | 2.5 | 2.5 |
| Adhesion of Resin Layer (C) (Number of Peeled Cells) | 0/100 | 0/100 | 0/100 | 0/100 | 0/100 | 76/100 | 51/100 | 49/100 |
| Total Luminous Transmittance (%) | 91.5 | 91.5 | 90.9 | 90.9 | 90.8 | 91.5 | 90.5 | 89.9 |
| Haze (%) | 0.9 | 1.1 | 2.4 | 2.6 | 2.9 | 1.5 | 1.9 | 18.5 |
| Modulus of Elasticity in Tension (Mpa) | 9 | 7.1 | 10 | 8.4 | 7.4 | 9.3 | 9.2 | 3.2 |

As is clear from Table 1, in each of Experimental Examples 1 to 13 in which the resin layer (C) was laminated on the nonwoven fabric layer (A) with the covering layer (B) interposed therebetween, a composite in which the adhesion between the nonwoven fabric layer (A) and the resin layer (C) is high and that has high transparency (high total luminous transmittance and low haze) was obtained. In addition, in the experimental examples in which the resin layer (C) was directly laminated on the nonwoven fabric layer (A) containing 86.9 mass % fine fiber cellulose (Experimental Examples 14 and 15), a composite with higher strength and higher transparency than those of the experimental example in which the resin layer (C) was directly laminated on the nonwoven fabric layer (A) containing 40 mass % fine fiber cellulose (Experimental Example 16) was obtained.

Experimental Example 17

In Experimental Example 1, a composite was produced by depositing the covering layer (B) on the nonwoven fabric layer (A) but not depositing the resin layer (C). That is, a bonding sheet (composite) which is composed of two layers that are the nonwoven fabric layer (A) and the covering layer (B) was produced. The adhesion between the nonwoven fabric layer (A) and the covering layer (B) was evaluated. Other than that, a test was conducted with a similar method to that in Experimental Example 1. Table 2 shows the results.

Experimental Example 18

A test was conducted with a similar method to that in Experimental Example 17 except that after the covering layer was formed on one surface of the nonwoven fabric layer in Experimental Example 17, a covering layer with a thickness of 1.0 μm was also formed on the other surface of the nonwoven fabric layer through a similar procedure. Table 2 shows the results.

TABLE 2

|  | Experimental Example 17 | Experimental Example 18 |
|---|---|---|
| Density (g/cm³) of Nonwoven Fabric Layer (A) |  | 1.49 |
| Surface (one or both) Coated with Resin Layer (C) | — | — |
| Surface (one or both) Coated with Covering Layer | One Surface | Both Surfaces |
| Thickness (μm) of Nonwoven Fabric Layer (A) | 25 | 25 |
| Thickness (μm) of Covering Layer (B) | 1 | 1 |
| Thickness of Resin Layer (C) (μm/One Surface) | 2.5 | 2.5 |
| Adhesion of Covering Layer (B) (Number of Peeled Cells) | 0/100 | 0/100 |
| Total Luminous Transmittance (%) | 92.8 | 92.4 |
| Haze (%) | 1.1 | 1.2 |

As is clear from Table 2, the bonding sheet obtained by laminating a covering layer on a nonwoven fabric layer (sheet layer) (Experimental Examples 17 and 18) has high adhesion between the nonwoven fabric layer and the covering layer and high transparency.

Experimental Example 19

The fragility of the composite produced in Experimental Example 1 was evaluated with the following method (hereinafter referred to as "evaluation of fragility"). Table 3 shows the results.
<Evaluation of Fragility>
A composite (length: 10 cm×width: 10 cm) was bent with hands, and visual evaluation was conducted as to whether the nonwoven fabric composite had cracks generated therein.
○: No cracks generated
×: Cracks generated Experimental Example 20

The fragility of the composite produced in Experimental Example 2 was evaluated with a similar method to that in Experimental Example 19. Table 3 shows the results.

Experimental Example 21

A test was conducted with a similar method to that in Experimental Example 1 except that silsesquioxane ("COMPOCERAN SQ107" produced by ARAKAWA CHEMICAL INDUSTRIES, LTD.) was used instead of polyester resin as the covering layer. The fragility of the produced composite was evaluated with a similar method to that in Experimental Example 19. Table 3 shows the results.

Experimental Example 22

A test was conducted with a similar method to that in Experimental Example 2 except that silsesquioxane ("COMPOCERAN SQ107" produced by ARAKAWA CHEMICAL INDUSTRIES, LTD.) was used instead of polyester resin as the covering layer. The fragility of the produced composite was evaluated with a similar method to that in Experimental Example 19. Table 3 shows the results.

TABLE 3

|  | Components of Covering Layer | Surface Coated with Covering Layer and Resin Layer | Evaluation of Fragility | Adhesion of Resin Layer (C) (Number of Peeled Cells) | Total Luminous Transmittance (%) | Haze |
|---|---|---|---|---|---|---|
| Experimental Example 19 | Polyester Resin | One Surface | X | 0/100 | 91.5 | 1.8 |
| Experimental Example 20 | Polyester Resin | Both Surfaces | X | 0/100 | 91.9 | 1.0 |
| Experimental Example 21 | Silsesquioxane | One Surface | ○ | 0/100 | 91.3 | 0.9 |
| Experimental Example 22 | Silsesquioxane | Both Surfaces | ○ | 0/100 | 91.5 | 1.1 |

The composite formed by using silsesquioxane as the covering layer (Experimental Examples 21 and 22) had no cracks generated therein in comparison with the composite formed by using polyester resin as the covering layer (Experimental Examples 19 and 20).

Experimental Example 23

A post-UV adhesive ("DC011" produced by New Tac Kasei Co., Ltd., which has a thickness of 25 μm) was bonded as the covering layer (B) to the nonwoven fabric layer (A) obtained in Experimental Example 1. Further, a PET film ("Lumirror S10" produced by Toray Industries, Inc., which has a thickness of 25 μm) was bonded as the film layer (C) to the upper surface of the covering layer (B). After that, the layer was irradiated with ultraviolet rays of 250 mJ/cm² 6 times from the film layer (C) side using a UV conveyor system ("ECS-4011GX" produced by EYE GRAPHICS CO., LTD.), whereby the covering layer (B) was cured. Through the aforementioned procedure, a composite was obtained in which the film layer (C) was laminated on one surface of the nonwoven fabric layer (A) with the covering layer (B) interposed therebetween. Table 4 shows the results.

Experimental Example 24

In Experimental Example 23, after the covering layer (B) and the film layer (C) were laminated on one surface of the sheet layer (A), another covering layer (B) and another film layer (C) were also laminated on the other surface through a similar procedure. Through the aforementioned procedure, a composite was obtained in which the film layer (C) was laminated on both surfaces of the sheet layer (A) with the covering layer (B) interposed therebetween. Table 4 shows the results.

TABLE 4

| | Components of Covering Layer | Surface Coated with Covering Layer and Resin Layer | Adhesion of Resin Layer (C) (Number of Peeled Cells) | Total Luminous Transmittance (%) | Haze (%) |
|---|---|---|---|---|---|
| Experimental Example 23 | Acrylic Adhesive | One Surface | 0/100 | 91.4 | 2.4 |
| Experimental Example 24 | Acrylic Adhesive | Each Surface | 0/100 | 91.5 | 2.6 |

The composite formed by using an adhesive as the covering layer (Experimental Examples 23 and 24) was also found to have good adhesion between the nonwoven fabric layer (sheet layer) and the resin layer.

The invention claimed is:

1. A composite comprising a sheet layer and one of a curable resin layer or a film layer formed on one or both surfaces of the sheet layer, the sheet layer containing as a main component fine fibers with an average fiber width of 2 to 1000 nm, wherein the sheet layer comprises a hydrophilic polymer or a hydrophilic low-molecular weight compound;
wherein the sheet layer is a nonwoven fabric; and
wherein a density of the sheet layer is greater than or equal to 0.90 g/cm³ and is less than or equal to 1.60 g/cm³.

2. The composite according to claim 1, wherein the one of the curable resin layer or the film layer is laminated on the one or both surfaces of the sheet layer with a covering layer interposed therebetween, the covering layer being provided on one or both surfaces of the sheet layer.

3. The composite according to claim 1, wherein a haze is less than or equal to 3%.

4. The composite according to claim 2, wherein a haze is less than or equal to 3%.

5. The composite according to claim 1, wherein the average fiber width of the fine fibers is 2 to 100 nm.

6. The composite according to claim 1, wherein the fine fibers are fibers comprising cellulose fibers.

7. The composite according to claim 2 wherein a thickness of the sheet layer is 2 to 150 μm, a thickness per covering layer is 0.1 to 30 μm, and a thickness per curable resin layer or film layer is 0.2 to 100 μm.

8. The composite according to claim 2, wherein an adhesion between the sheet layer and the curable resin layer or the film layer, in terms of a number of peeled cells out of 100 cells in a cross-cut test conducted in accordance with JIS K 5400, is less than or equal to 10.

9. The composite according to claim 2, wherein a total luminous transmittance is greater than or equal to 85%, and a haze is less than or equal to 10%.

10. The composite according to claim 2, wherein the covering layer is a hybrid material of an organic component and an inorganic component.

11. The composite according to claim 10, wherein the hybrid material of the organic component and the inorganic component contains an organic component and an inorganic component having a silicone skeleton.

12. The composite according to claim 10, wherein the organic component is at least one component selected from the group consisting of a methyl group, a mercapto group, a methacryl group, an acryloyl group, a vinyl group, and an amino group.

13. The composite according to claim 10, wherein the hybrid material of the organic compound and the inorganic compound is silsesquioxane.

14. The composite according to claim 2, wherein the covering layer contains at least one type of resin selected from the group consisting of heat-curable resin, thermoplastic resin, and photo-curable resin.

15. The composite according to claim 2, wherein the covering layer is an adhesive.

16. An illumination device, a projection device, a signboard or an image display device, a touch panel, or a solar cell, which comprises the composite according to claim 1.

* * * * *